United States Patent
Post et al.

(10) Patent No.: US 8,595,414 B2
(45) Date of Patent: Nov. 26, 2013

(54) SELECTIVELY COMBINING COMMANDS FOR A SYSTEM HAVING NON-VOLATILE MEMORY

(75) Inventors: Daniel J. Post, Cupertino, CA (US); Nir J. Wakrat, Los Altos, CA (US); Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 12/895,039

(22) Filed: Sep. 30, 2010

(65) Prior Publication Data

US 2012/0084484 A1    Apr. 5, 2012

(51) Int. Cl.
*G06F 12/02*    (2006.01)

(52) U.S. Cl.
USPC .... 711/103; 711/102; 711/206; 711/E12.008; 711/E12.078; 710/308

(58) Field of Classification Search
USPC .......... 711/103, 102, 206, E12.008, E12.078; 710/308
See application file for complete search history.

(56) References Cited

U.S. PATENT DOCUMENTS

| | | |
|---|---|---|
| 7,260,711 B2 | 8/2007 | Symes |
| 7,653,849 B1 | 1/2010 | Tabatabaei |
| 2004/0215705 A1 | 10/2004 | Hosomi |
| 2007/0002626 A1* | 1/2007 | Li ............................ 365/185.12 |
| 2007/0260855 A1 | 11/2007 | Gschwind et al. |
| 2010/0002512 A1* | 1/2010 | Cornwell et al. ........ 365/185.09 |
| 2011/0066626 A1* | 3/2011 | Dharmalingam ............. 707/758 |

FOREIGN PATENT DOCUMENTS

JP    2000163354    6/2000

* cited by examiner

*Primary Examiner* — Yong Choe
(74) *Attorney, Agent, or Firm* — Van Court & Aldridge LLP (57) ABSTRACT

Systems and methods are disclosed for selectively combining commands for a system having non-volatile memory ("NVM"). In some embodiments, a command dispatcher of a system can receive multiple commands to access a NVM for a period of time. After receiving the multiple commands, the command dispatcher can determine a set of commands that are naturally combinable. In some embodiments, the command dispatcher can select commands that are fairly distributed across different chip enables ("CEs") and/or buses. After selecting the set of commands, the command dispatcher can combine the set of commands into a multi-access command. Finally, the command dispatcher can dispatch the multi-access command to the NVM.

24 Claims, 8 Drawing Sheets

SELECTIVELY COMBINING COMMANDS FOR A SYSTEM HAVING NON-VOLATILE MEMORY

FIELD OF THE INVENTION

This invention can relate to systems and methods for selectively combining commands for a system having a non-volatile memory.

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

A system may often dispatch multiple small commands (e.g., program, erase, and/or read commands) to access the NVM. Each command dispatch can be associated with various communication latencies. Moreover, each command dispatch can also block other commands for being acted upon. Thus, the total amount of time for dispatching commands can become significant, which can consequently increase the total power consumption of the system and decrease input/output ("I/O") performance.

SUMMARY OF THE DISCLOSURE

Systems and methods are disclosed for selectively combining commands for a system having non-volatile memory ("NVM"). In particular, a system can combine a set of naturally combinable commands into a multi-access command, where the set of commands can be selected based on knowledge of the mapping between the commands to various portions of the NVM (e.g., chip enables ("CEs") and/or buses). The multi-access command can then be dispatched to a NVM. Because only a single command is dispatched instead of a series of commands, this approach can reduce both input/output ("I/O") overhead and power consumption of the system, and improve overall system performance.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for selectively combining commands for a system having non-volatile memory ("NVM") are provided. In particular, a system can combine a set of small sequential commands into a multi-access command, which can then be dispatched to a NVM. In some embodiments, the system can select the set of commands based on knowledge of the mapping between the commands and various portions of the NVM (e.g., chip enables ("CEs") and/or buses).

For example, a command dispatcher of a system can receive commands to access a NVM for a period of time. After receiving the commands, the command dispatcher can select a set of commands that are naturally combinable (e.g., the set of commands may share one or more common characteristics). The set of command may otherwise be logically unrelated to each other.

For example, the command dispatcher can select commands that are both small and sequential. As another example, the command dispatcher can select commands that are the same type of command (e.g., read, program, or erase commands). As yet another example, the command dispatcher can select commands based on an input/output ("I/O") priority associated with each command.

In some embodiments, the command dispatcher may select or adjust the set of commands based on one or more expected performance characteristics associated with each command (e.g., based on a mapping between each command and at least one portion of the NVM). For example, the command dispatcher can select commands that are fairly distributed across different portions of the NVM (e.g., different chip enables ("CEs") and/or buses). That is, the command dispatcher may select only a single command from a CE and/or a bus, such that no CE or bus is double-stacked. As used herein, "double-stacked" may refer to a scenario where two or more commands are selected for a single portion of the NVM. In such a scenario, the command dispatcher may select to defer one or more commands that collide with commands already selected for the set of commands (e.g., commands corresponding to the same CEs and/or buses). In addition, the command dispatcher may also select to leave some CEs and/or buses idle.

In other embodiments, in order to promptly service paging requests and file system metadata updates, the command dispatcher can determine a size of each command of the set of commands, and adjust the size of the set of commands based on the determined size.

After selecting and/or adjusting the set of commands, the command dispatcher can combine the set of commands into a multi-access command, and subsequently dispatch the multi-access command to the NVM. In some embodiments, the command dispatcher can dispatch the multi-access command to one or more NVM dies of the NVM. In other embodiments, the command dispatcher can dispatch the multi-access command to a NVM controller of the NVM. The NVM controller can then separate the multi-access command into individual commands and perform associated access functions.

Figure 1:
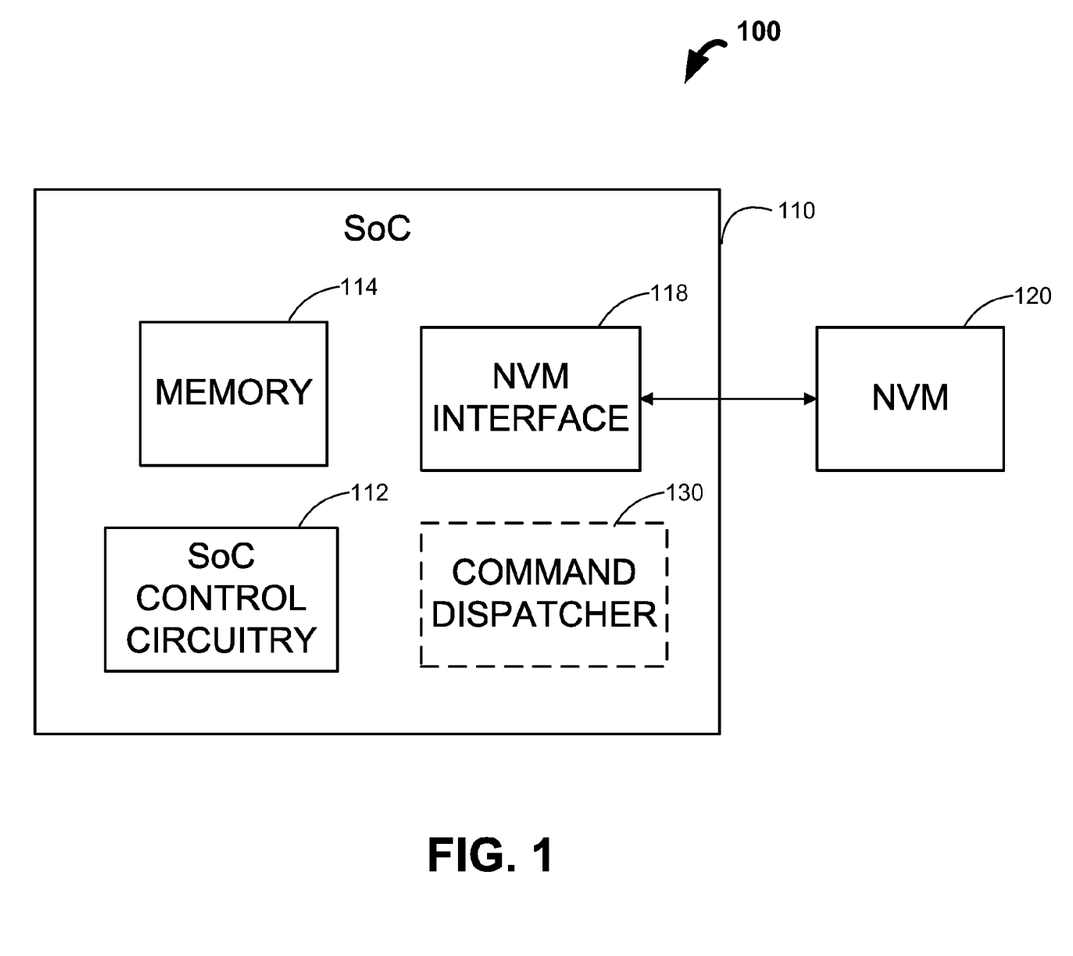
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which is the smallest erasable unit, and further organized into "pages", which can be the smallest unit that can be programmed or read. In some embodiments, NVM 120 can include multiple integrated circuits (e.g., one or more dies), where each integrated circuit may have multiple blocks. The blocks from corresponding integrated circuits (e.g., blocks having the same position or block number) may form "super blocks". Each memory location (e.g., page or block) of NVM 120 can be referenced using a physical address (e.g., a physical page address or physical block address).

System-on-a-chip 110 can include SoC control circuitry 112, memory 114, NVM interface 118, and command dispatcher 130. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as random access memory (e.g., static RAM ("sRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

Command dispatcher 130 can be configured to dispatch one or more commands to NVM 120. In some embodiments, command dispatcher 130 can include a block device driver or wrapper that can be configured to dispatch application programming interface ("API") operations to NVM 120 or a NVM controller of NVM 120 (discussed below). In some embodiments, command dispatcher 130 can modify one or more parameters of the block device driver or wrapper in order to transfer information to NVM 120 or the NVM controller. For example, by modifying the one or more parameters, command dispatcher 130 can transfer information associated with commands used to access NVM 120 (e.g., read, program, erase, and/or multi-access commands). Multi-access commands will be discussed in more detail in connection with FIGS. 6-9.

Command dispatcher 130 is shown with a dashed-line box in FIG. 1 to indicate that its function can be implemented in different locations. In some embodiments, command dispatcher 130 can be implemented as a software component executed by SoC control circuitry 112 and/or NVM interface 118. In other embodiments, command dispatcher 130 can be a stand-alone module in SoC 110.

While SoC control circuitry 112, NVM interface 118, and command dispatcher 130 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or Secure Digital ("SD") card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
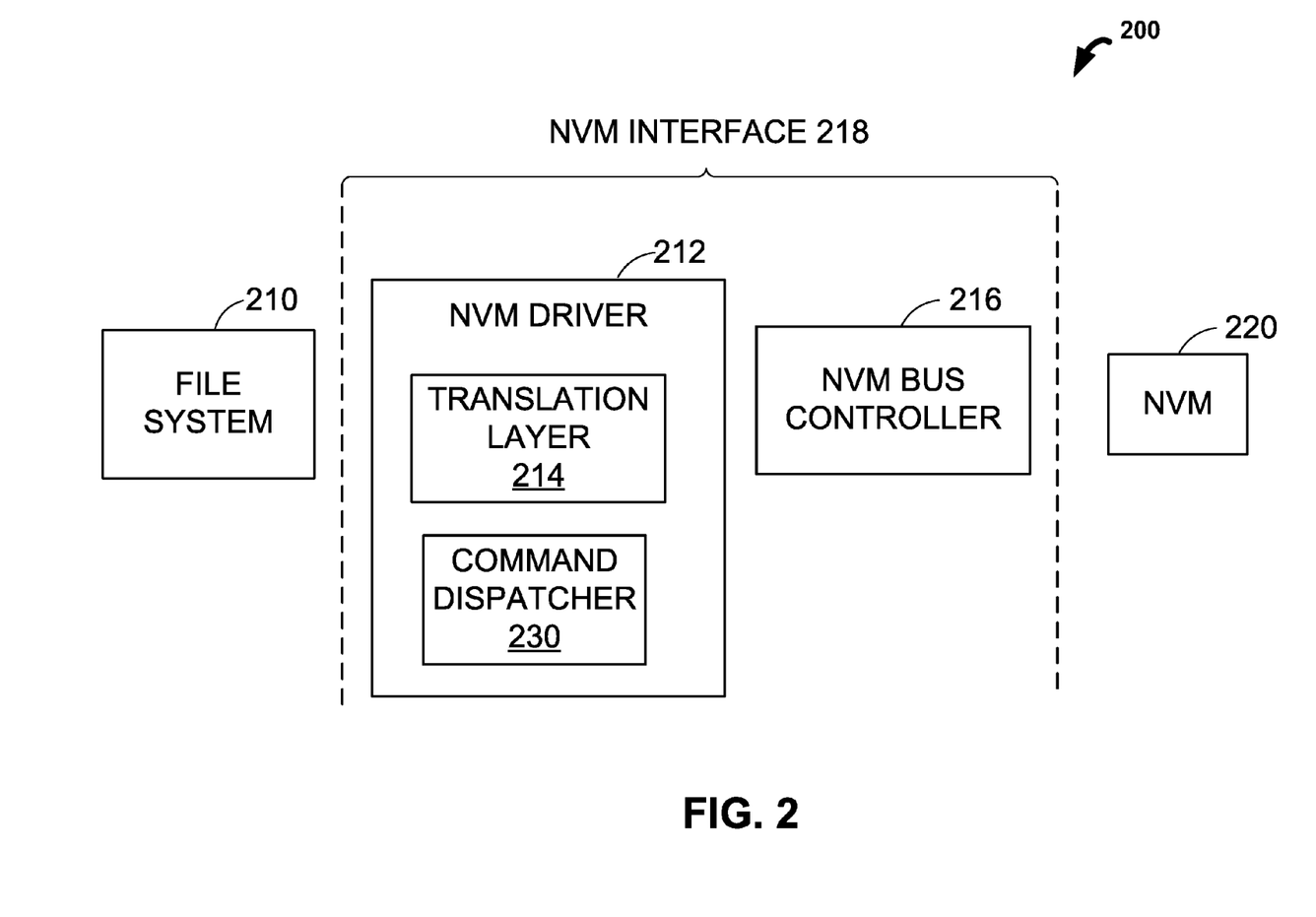

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical to physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write command, translation layer 214 can map the provided logical address to a free, erased physical location on NVM 220. On a read command, translation layer 214 can use the provided logical address to determine the physical address at which the requested data is stored. Because each NVM may have a different layout depending on the size or vendor of the NVM, this mapping operation may be memory and/or vendor-specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access commands (e.g., program, read, and erase commands). Bus controller 216 may act as the hardware interface to NVM 220, and can communicate with NVM 220 using the bus protocol, data rate, and other specifications of NVM 220.

NVM driver 212 can include command dispatcher 230, which can be the same as or similar to command dispatcher 130 (FIG. 1). Upon receiving an access request from file system 210, command dispatcher 230 can direct NVM bus controller 216 to dispatch a command (e.g., an API operation) to NVM 220. In some embodiments, command dispatcher 230 may use translation layer 214 to obtain the physical addresses of one or more memory locations of NVM 220. Persons skilled in the art will appreciate that although command dispatcher 230 is shown as being included in NVM driver 212, command dispatcher 230 can be implemented in any suitable location of electronic device 200. For example, command dispatcher 230 can be a stand-alone module in NVM interface 218.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, ECC data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

Figure 3:
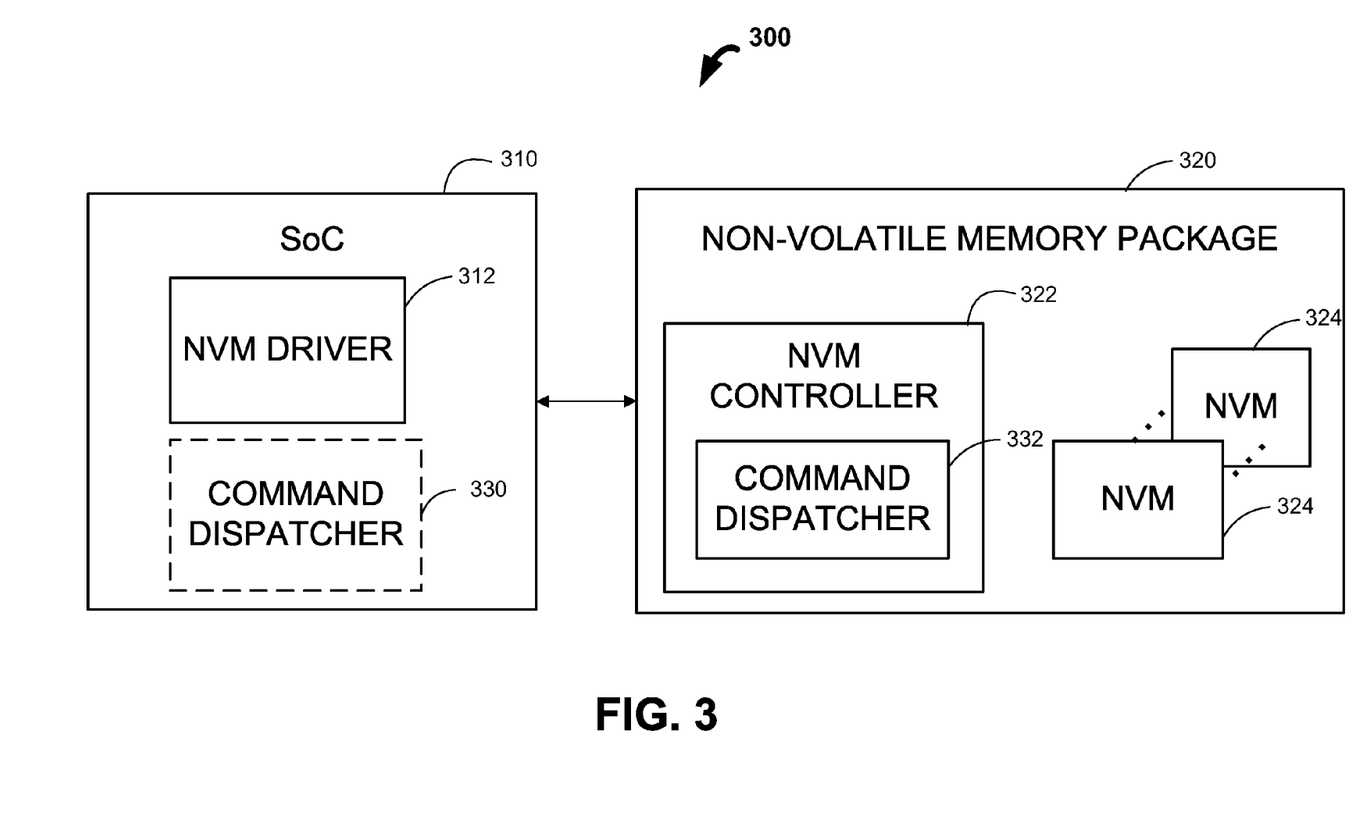
FIG. 3 is a block diagram of an illustrative system including a system-on-a-chip and a managed non-volatile memory package configured in accordance with various embodiments of the invention.

FIG. 3 illustrates a block diagram of system 300, which is an example of one embodiment of electronic device 100 of FIG. 1 or of electronic device 200 of FIG. 2. System 300 can include SoC 310 and at least one non-volatile memory ("NVM") package 320. SoC 310 and optionally NVM package 320 can be implemented in any suitable host device or system, such as a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, or a laptop computer.

SoC 310 can include or operate in conjunction with any other components or circuitry capable of controlling various operations of system 300 (e.g., application-specific integrated circuits ("ASICs")). In a processor-based implementation, SoC 310 can execute firmware and software programs loaded into a memory implemented on the host (e.g., memory 114 of FIG. 1).

SoC 310 can perform any of the functions of SoC 110 of FIG. 1. For example, SoC 310 can execute NVM driver 312, which may provide vendor-specific and/or technology-specific instructions that enable SoC 310 to perform various memory management and access functions for non-volatile memory package 320.

In order to provide access to memory locations of non-volatile memory package 320, SoC 310 can execute command dispatcher 330, which may be configured to dispatch any suitable command to NVM controller 322. Command dispatcher 330 may be the same as or similar to command dispatcher 130 (FIG. 1) or command dispatcher 230 (FIG. 2). Accordingly, command dispatcher 330 is shown with a dashed-line box in FIG. 3 to indicate that its function can be implemented in different locations. For example, command dispatcher 330 can be implemented as a software component executed by SoC 310 and/or a NVM interface (e.g., NVM interface 118 of FIG. 1 or NVM interface 218 of FIG. 2). In some embodiments, command dispatcher 130 can be a module that is included in NVM driver 312 (e.g., as shown in FIG. 2). In other embodiments, command dispatcher 310 can be a stand-alone module in SoC 310. The various commands that may be dispatched by command dispatcher 330 are discussed in more detail below.

NVM package 320 may be a managed NVM package. As used herein, a "managed NVM" may refer to a memory device or package that includes a controller (e.g., NVM controller 322) configured to perform at least one memory management function for a non-volatile memory. For example, as shown in FIG. 3, NVM controller 322 can perform memory management functions for any suitable number of NVM dies 324.

NVM controller 322 may include any suitable combination of processors, microprocessors, or hardware-based components (e.g., ASICs), and may include the same components as or different components from SoC 310. NVM controller 322 may share the responsibility of managing and/or accessing the physical memory locations of NVM dies 324 with NVM driver 312. Alternatively, NVM controller 322 may perform substantially all of the management and access functions for NVM dies 324.

Memory management and access functions that may be performed by NVM controller 322 and/or SoC 310 for NVM dies 324 can include issuing read, write, or erase instructions and performing wear leveling, bad block management, garbage collection, logical-to-physical address mapping, SLC or MLC programming decisions, applying error correction or detection, and data queuing to set up program operations.

In some embodiments, NVM controller 322 can execute command dispatcher 332, which can be configured to dispatch any suitable data to SoC 310. Command dispatcher 332 can also be configured to reorder commands that have been dispatched by SoC 310 or command dispatcher 330. Thus, in some implementations, command dispatcher 332 can work in conjunction with command dispatcher 330 in order to transmit commands between SoC 310 and NVM controller 322. Although command dispatcher 332 and NVM controller 322 are shown as separate modules, persons skilled in the art will appreciate that the functionalities of command dispatcher 332 can instead be implemented directly in NVM controller 322.

NVM dies 324 may be used to store information that needs to be retained when system 300 is powered down. As used herein, and depending on context, a "NVM" can refer to one or more of NVM dies in which data can be stored, a NVM controller, or a NVM package that includes the NVM controller and the NVM dies.

Figure 4:
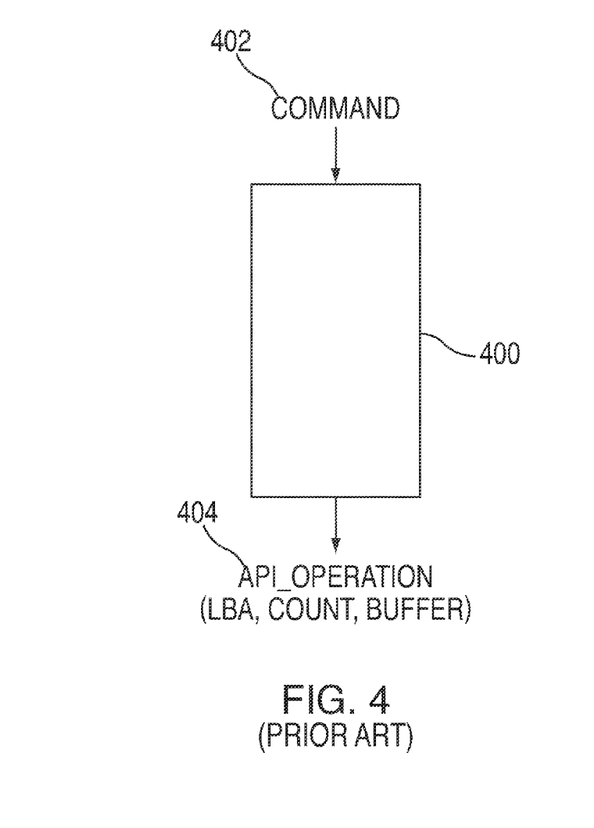
FIG. 4 is a graphical view of an illustrative command dispatcher configured in accordance with a conventional system.

Referring now to FIG. 4, a graphical view of illustrative command dispatcher 400 is shown. Command dispatcher 400 can be configured in accordance with a conventional system.

Command dispatcher 400 of a host may receive commands from a file system (e.g., file system 210 of FIG. 2) to access one or more memory locations in a NVM (e.g., NVM 120 of FIG. 1, NVM 220 of FIG. 2, or NVM 320 of FIG. 3). For example, after receiving command 402 (e.g., a read, program, or erase command) to access one or more of NVM dies 324 (FIG. 3), command dispatcher 400 may dispatch command 402 to the NVM as dispatched command 404. For instance, command dispatcher 400 or a NVM driver (e.g., NVM driver 212 of FIG. 2) may direct a bus controller (e.g., NVM bus controller 216 of FIG. 2) to dispatch command 402 to the NVM. In some cases, dispatched command 404 can be in the form of an application programming interface ("API") operation. An API can be any suitable interface that can allow a software program or module to interact with other software.

For example, if command 402 is a read command, command dispatcher 400 can dispatch an API operation with the following format:

$$\text{READ(LBA,COUNT,BUFFER)} \tag{1},$$

where LBA can correspond to a logical block address associated with the API operation, COUNT can correspond to a counter associated with the API operation, and BUFFER can correspond to a data structure used to temporarily store data obtained from one or more memory locations of the NVM. In some embodiments, after the API operation has been dispatched to the NVM, a NVM controller (e.g., NVM controller 322 of FIG. 3) can use the LBA to determine the physical address at which the requested data is stored.

Figure 5:
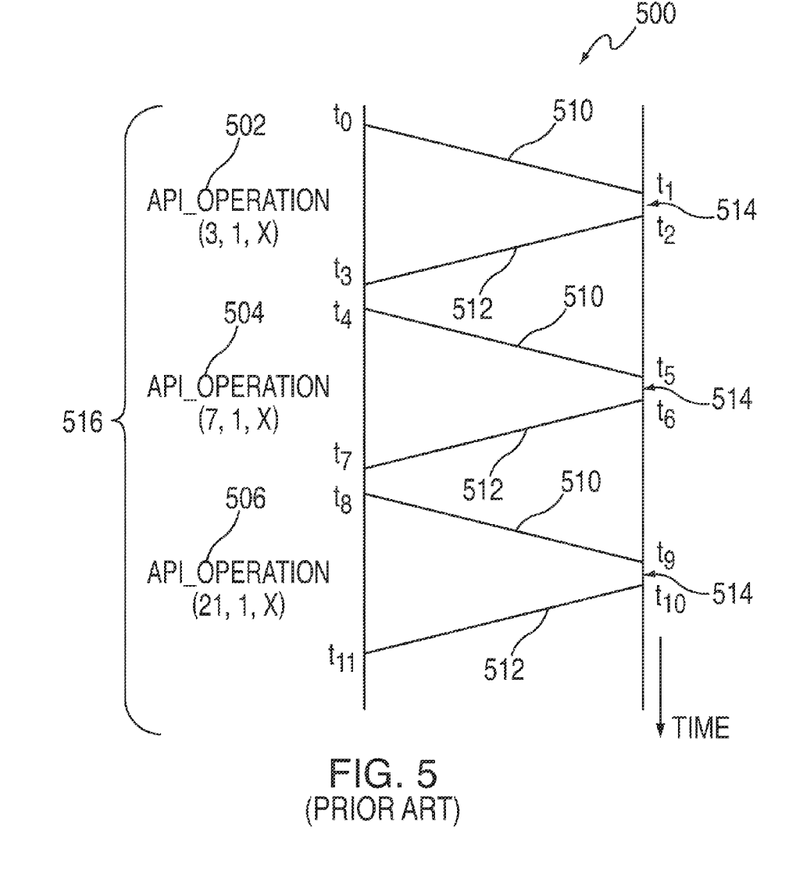
FIG. 5 is an illustrative timing diagram for dispatching commands to a NVM in a conventional system.

Referring now to FIG. 5, illustrative timing diagram 500 is shown for dispatching three commands 502, 504, and 506 to a NVM in a conventional system. As discussed previously, each dispatched command 502-506 can be in the format of an API operation and can be associated with a LBA, a COUNT, and a BUFFER. For example, each dispatched command 502-506 can have a format that is the same as or similar to the format of dispatched command 404 (FIG. 4).

Each dispatched command 502-506 may be associated with various communication latencies or input/output ("I/O") overhead. For example, each dispatched command can be associated with an execution latency (not shown in FIG. 5) while the command is being sent to an I/O processor, and transfer latency 510 while the command is being transferred to the NVM over a bus. In addition, once the dispatched command reaches the NVM, setup latencies may be introduced as a NVM controller (e.g., NVM controller 322 of FIG. 3) performs physical NAND setup. While the NVM controller is performing the NAND setup, the NVM may remain busy such that a command dispatcher of a host is unable to send any additional commands. In the example shown in FIG. 5, for instance, each dispatched command 502-506 can have a setup latency 514 that corresponds to a time period equal to the difference between $t_2$ and $t_1$, $t_6$ and $t_5$, and $t_{10}$ and $t_9$, respectively.

After the physical NAND setup has completed and the command has been executed by the NVM controller, the NVM controller may transfer data or any other suitable information back to the command dispatcher over a bus. The latencies associated with this bus transfer may be represented by transfer latency 512.

Consequently, after dispatching a command to the NVM, the command dispatcher of a host generally needs to wait for a period of time before dispatching another command. For example, after dispatching command 502, the command dispatcher needs to wait for a time period equal to the difference between $t_3$ and $t_0$ before the dispatcher is able to dispatch command 504. Similarly, after dispatching command 504, the command dispatcher needs to wait for a time period equal to the difference between $t_7$ and $t_4$ before the dispatcher is able to dispatch command 506.

Over time, these communication latencies can accumulate to a point where the total amount of time for the transmission of commands 502-506 becomes significant. In the example shown in FIG. 5, for instance, the dispatch of commands 502-506 can be associated with overall latency 516 (e.g., corresponding to a time period equal to the difference between $t_{11}$ and $t_0$). The significant amount of time required for dispatching commands 502-506 can consequently increase the total power consumption of the system and reduce I/O performance. This may in turn reduce system interactivity and other productivity measurements.

Accordingly, a command dispatcher of a system or a host can be configured to combine a set of commands into a single multi-access command. In some embodiments, the command dispatcher can select the set of commands based on knowledge of the mapping between the sequential commands and various portions of the NVM (e.g., CEs and/or buses). Moreover, the command dispatcher can further be configured to dispatch the multi-access command to the NVM. Because only a single command is dispatched instead of a series of commands, this approach can reduce both I/O overhead and power consumption of the system. Additionally, this approach may take advantage of parallelism in the NVM that would be left unused for a single small command dispatch.

Figure 6:
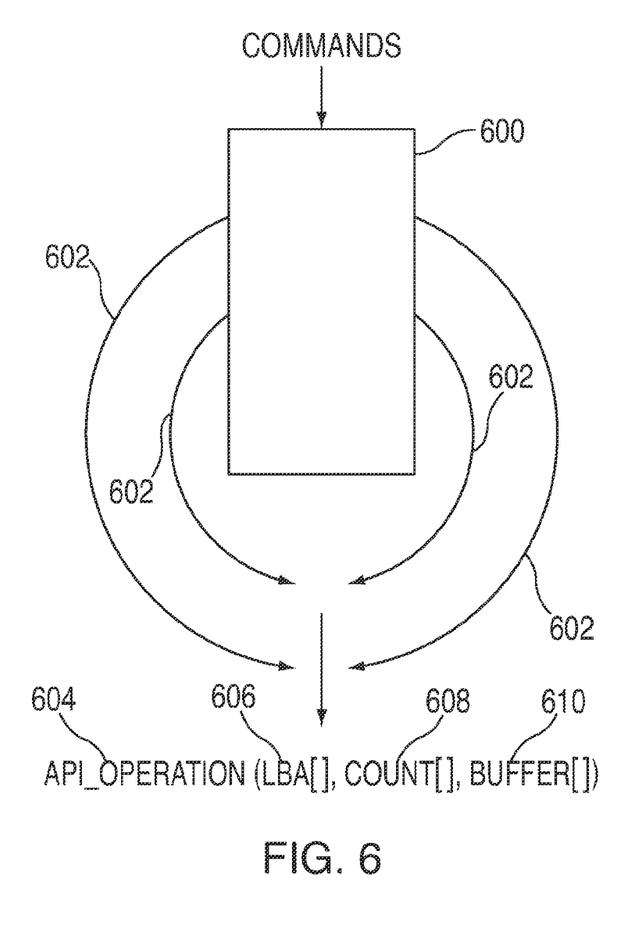
FIG. 6 is a graphical view of an illustrative command dispatcher configured in accordance with various embodiments of the invention.

Referring now to FIG. 6, a graphical view of an illustrative command dispatcher 600 is shown. Command dispatcher 600 can be the same as or substantially similar to command dispatcher 130 of FIG. 1, command dispatcher 230 of FIG. 2, or command dispatcher 330 of FIG. 3.

Command dispatcher 600 may receive multiple commands to access one or more memory locations of a NVM for a period of time. In some cases, command dispatcher 600 can save the multiple commands in a command queue.

After receiving the multiple commands, command dispatcher 600 can select a set of commands 602 that are naturally combinable, but are otherwise logically unrelated to each other. In some embodiments, command dispatcher 600 can select set of commands 602 based at least in part on a common characteristic of commands 602. For example, command dispatcher 600 can select commands 602 that are both small and sequential.

As another example, command dispatcher 600 can select commands 602 that are the same type of command (e.g., read, program, or erase commands). As a result, set of commands 602 may include only read, program, or erase commands. Thus, if during a particular period of time, command dispatcher 600 receives five read commands, followed by two program commands and five more read commands, command dispatcher 600 can determine that the ten read commands are the same type of command and therefore are naturally combinable.

In some embodiments, command dispatcher 600 can select set of commands 602 based on an I/O priority associated with each command. For example, command dispatcher 600 can first rank the multiple commands based on associated I/O priorities. Then, command dispatcher 600 can select set of commands 602 based at least in part on a rank associated with each command of set of commands 602. For example, set of commands 602 can include those commands that have the highest or lowest I/O priorities. Persons skilled in the art will appreciate that this is merely an illustrative example, and command dispatcher 600 can use any suitable criteria to rank and select set of commands 602.

After determining set of commands 602, command dispatcher 600 can combine commands 602 into multi-access command 604. In some embodiments, command dispatcher 600 can form multi-access command 604 by combining a set of logical addresses, a set of counters, and a set of buffers associated with set of commands 602 into an array of logical addresses 606, an array of counters 608, and an array of buffers 610, respectively. For instance, each of array of buffers 608 may be used to cache data associated with a particular command of set of commands 602.

In some embodiments, in addition to forming multi-access command 604, command dispatcher 600 can remove each individual command included in set of commands 602 from the command queue. Command dispatcher 600 can then save multi-access command 604 in the command queue in order to dispatch the command. In some embodiments, command dispatcher 600 can save multi-access command 604 at the end of the command queue. As a result, multi-access command 604 can be dispatched only after commands that are already in the command queue have been dispatched. In other embodiments, command dispatcher 600 can save multi-access command 604 at the beginning of the command queue. As a result, multi-access command 604 can be dispatched prior to dispatching any other command in the command queue.

At an appropriate time, command dispatcher 600 can dispatch multi-access command 604 to the NVM. For instance, command dispatcher 600 or a NVM driver (e.g., NVM driver 212 of FIG. 2) may direct a bus controller (e.g., NVM bus controller 216 of FIG. 2) to dispatch multi-access command 604 to the NVM.

In some embodiments, command dispatcher 600 can dispatch multi-access command 604 to the NVM in the form of an API operation. For example, if multi-access command 604 has been combined from a set of read commands, command dispatcher 600 can dispatch multi-access command 604 in the form of an API operation with the following format:

$$\text{MULTI\_READ(LBA[ ],COUNT[ ],BUFFER[ ])} \quad (2),$$

where LBA[ ] can correspond to an array of logical addresses associated with the API operation, COUNT[ ] can correspond to an array of counters associated with the API operation, and BUFFER[ ] can correspond to an array of buffers used to store data obtained from one or more memory locations of the NVM. In some embodiments, command dispatcher 600 can dispatch multi-access command 604 to one or more NVM dies (e.g., NVM dies 324 of FIG. 3).

In other embodiments, command dispatcher 600 can dispatch multi-access command 604 to a NVM controller (e.g., NVM controller 322 of FIG. 3). Upon receiving multi-access command 604, the NVM controller can separate multi-access command 604 into its component set of commands. In some embodiments, a command dispatcher of a NVM (e.g., command dispatcher 332 of FIG. 3) can reorder the set of commands such that the NVM controller can process the commands efficiently. In addition, the NVM controller can translate the array of logical addresses associated with the set of commands (e.g., LBA[ ]) into respective physical addresses.

Based on the set of commands, the NVM controller can perform access functions on memory locations corresponding to the respective physical addresses. For instance, if the set of commands includes read commands, the NVM controller can read data stored at memory locations corresponding to the physical addresses. Similarly, if the set of commands includes writes commands, the NVM controller can program data to memory locations corresponding to the physical addresses. Persons skilled in the art will appreciate that any other types of commands or any combination of commands can be executed by the NVM controller.

In some embodiments, after the set of commands have been executed, a command dispatcher of the NVM (e.g., command dispatcher 332 of FIG. 3) can combine information obtained from multiple memory locations into a single piece of data for dispatch to the host. Similar to command dispatcher 600, the command dispatcher of the NVM can use any suitable approach to form the single piece of data.

Figure 7:
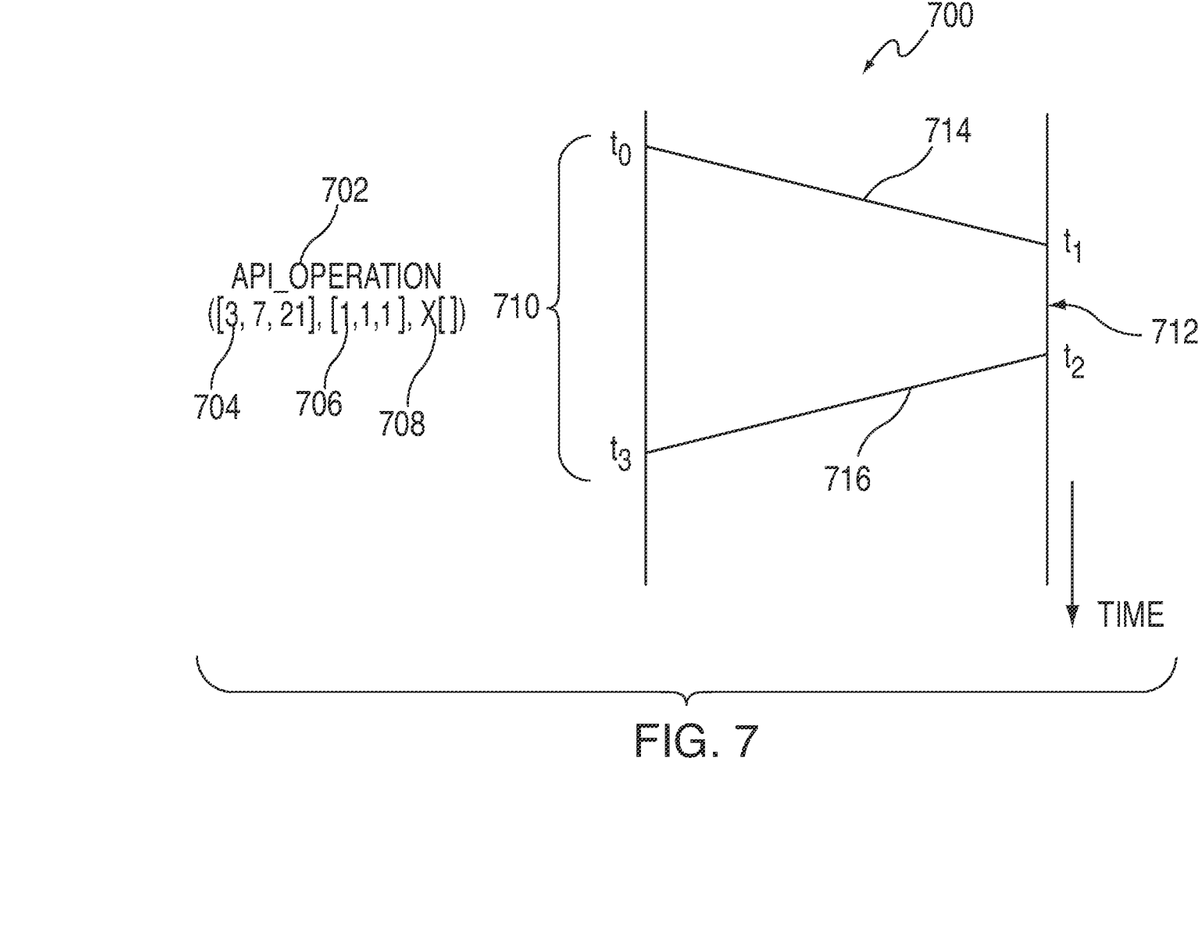
FIG. 7 is an illustrative timing diagram for dispatching commands to a NVM in accordance with various embodiments of the invention.

Referring now to FIG. 7, illustrative timing diagram 700 is shown for multi-access command 702. Multi-access command 702 can be associated with array of LBAs 704, array of counters 706, and array of buffers 708. Thus, multi-access command 702 can have a format that is the same as or similar to the format of multi-access command 604 (FIG. 6).

By combining multiple small commands into a single multi-access command 702, a command dispatcher of a host (e.g., command dispatcher 130 of FIG. 1, command dispatcher 230 of FIG. 2, command dispatcher 330 of FIG. 3) can reduce both the overall amount of time required for transmitting commands and the overall power consumption of the system. Moreover, as mentioned previously, a command dispatcher of a NVM (e.g., command dispatcher 332 of FIG. 3) can also reduce the overall amount of time by forming a single piece of data for transmission back to the host.

Thus, although multi-access command 702 may take longer for a NVM controller to process, the overall latency associated with the dispatch of multi-access command 702 (e.g., overall latency 710 corresponding to a time period equal to the difference between $t_3$ and $t_0$) can still be shorter than overall latency 516 (FIG. 5) associated with separately dispatching each of commands 502-506 (FIG. 5). That is, although setup latency 712 associated with physical NAND setup (e.g., corresponding to a time period equal to the difference between $t_2$ and $t_1$) may be longer than each of setup latencies 514 (FIG. 5), overall latency 710 can still be shorter because command 702 is associated with only one set of transfer latencies 714 and 716 while commands 502-506 are associated with three sets of transfer latencies 510 and 512 (FIG. 5).

In some embodiments, in addition to or instead of selecting commands that are naturally combinable, a command dispatcher of a host can improve system performance by selecting commands based on expected performance characteristics associated with each command (e.g., based on a mapping between each command with at least one portion of the NVM). As mentioned above, a non-volatile memory (e.g., NVM 120 of FIG. 1, NVM 220 of FIG. 2, or NVM 320 of FIG. 3) can be organized into dies, blocks, pages, super blocks, and the like.

Figure 8:
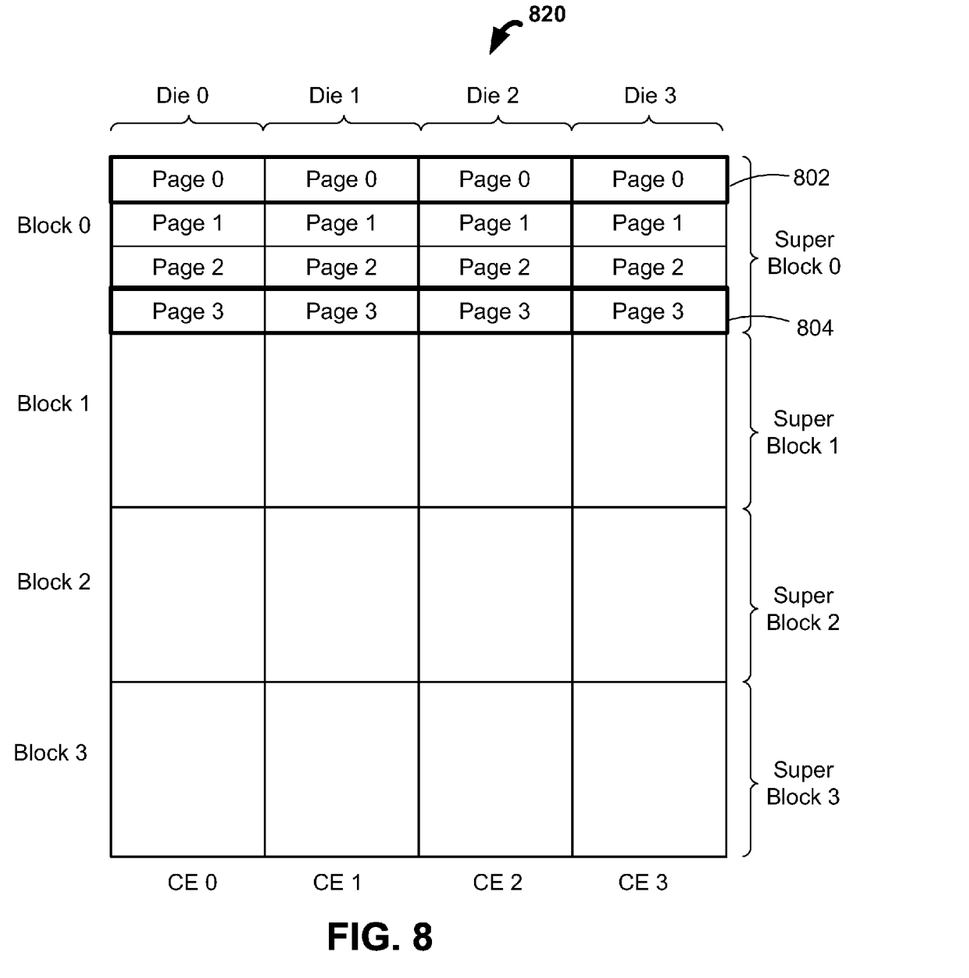
FIG. 8 is a functional view of a non-volatile memory in accordance with various embodiments of the invention.

For example, FIG. 8 shows a schematic layout of NVM 820. FIG. 8 is merely meant to illustrate the organizational layout of NVM 820 and does not indicate an actual, physical layout of the non-volatile memory. For example, although die 0 is illustrated as being next to die 1 in FIG. 8, this is merely for illustrating the functional relationship of these dies, and in the actual, physical layout of NVM 820, these dies may or may not be located near one another. Moreover, although a certain number of dies, blocks, and pages are shown in FIG. 8, this is merely for the purpose of illustration and one skilled in the art could appreciate that NVM 820 could include any suitable number of dies, blocks, and pages. As one illustration, each die of NVM 820 can include 4096 blocks, each block may include 64, 128, or 192 pages based on whether the block is an SLC block, 2-bit MLC block, or 3-bit MLC block, and each page can include 512 bytes.

As illustrated by FIG. 8, NVM 820 can include one or more dies (i.e., integrated circuits), such as die 0, die 1, die 2, and die 3. Each die may be associated with different chip enables ("CEs"). In the example shown in FIG. 8, for instance, CE 0 can be used to access die 0, CE 1 can be used to access die 1, CE 2 can be used to access die 2, and so forth. A command that is received to access NVM 820 may thus map to one or more CEs. Persons skilled in the art will appreciate that this is merely an illustrative example, and that the actual configuration for a particular NVM is vendor-specific. In particular, in some NVMs, two dies may be associated with a single CE.

Each logical CE generally corresponds to one bus, and can therefore form a portion of a bus. Correspondingly, each access command that is received to access NVM 820 may also map to one or more buses.

Each die of NVM 820 may be organized into one or more "blocks". For example, dies 0-3 is illustrated as each being organized into blocks 0-3.

Each block of the dies may be organized into one or more pages. For example, block 0 of each of dies 0-3 is illustrated as being organized into pages 0-3.

Each page of NVM 820 can include any suitable information. For example, the pages can include user data, metadata, or both. In some embodiments, metadata such as ECC data can be included in the pages to provide for error detection and/or correction of the information stored in NVM 820.

NVM 820 can also include one or more super blocks that include one block from each die that has the same position or "block number" in the die. For example, super block 0 of NVM 820 can include block 0 of each of dies 0-3. Similarly, super block 1 of NVM 820 can include block 1 of each of dies 0-3, super block 2 of NVM 820 can include block 2 of each of dies 0-3, and so forth.

Super blocks can be formed by virtually linking or "striping" together one or more blocks. Blocks need not be in the same row of each die to be virtually linked as a super block. In fact, blocks may be chosen randomly from two or more dies to form a super block. In some embodiments, a super block can include only one block. Super blocks provide operational parallelism, thereby enabling programming, reading, and erase operations to be performed on blocks located in different dies in parallel.

In addition, pages from two or more dies may be virtually linked together to form super pages or "stripes". For instance, stripe 802 can include page 0 from block 0 of each of dies 0-3. Similarly, stripe 804 can include page 3 from block 0 of each of dies 0-3. A translation layer (e.g., translation layer 214 of FIG. 2) being implemented in an NVM interface may keep track of super blocks or stripes.

A command dispatcher of a host (e.g., command dispatcher 130 of FIG. 1, command dispatcher 230 of FIG. 2, or command dispatcher 330 of FIG. 3) can improve system performance by adjusting the commands used to form a multi-access command. In some embodiments, based on a mapping between commands and various portions of the NVM, the command dispatcher can combine a set of commands such that the set of commands can be fairly distributed across different portions of the NVM (e.g., different CEs and/or buses). As a result, the command dispatcher can avoid idling certain CEs and/or buses and overloading other CEs and/or buses.

In particular, the command dispatcher may select only a single command from any CE and/or bus, such that no CE or bus is double-stacked. As used herein, "double-stacked" may refer to a scenario where two or more commands are selected for a single portion of the NVM. The command dispatcher may therefore select to defer one or more commands that collide with commands already selected for the set of commands (e.g., commands corresponding to the same CEs and/or buses). In addition, the command dispatcher may select to leave some CEs and/or buses idle.

The command dispatcher can use any suitable approach to fairly distribute the set of commands across different CEs and/or buses. For example, the command dispatcher can first determine the physical addresses associated with multiple commands received from a file system. For example, a translation layer (e.g., translation layer 214 of FIG. 2) of the system can be used to translate a set of logical addresses associated with the multiple commands into a set of physical addresses. Based on the set of physical addresses, the command dispatcher can determine the CE and/or bus associated with each command.

The command dispatcher can then combine a set of commands into a multi-access command, where the set of commands can be fairly distributed across different CEs and/or buses. In the example shown in FIG. 8, for instance, the multi-access command can include a combination of four read commands, where each read command maps to one or more CEs 0-3. Thus, in one embodiment, the multi-access command can be associated with stripe 802. Because of the fairly even distribution of the set of commands, the command dispatcher can dispatch at least a portion of the multi-access command to different dies of the NVM (e.g., dies 0-3 of NVM 820).

Persons skilled in the art will appreciate that this is merely an illustrative example. Thus, the command dispatcher can use any suitable combination of commands where the commands can be generally distributed across different CEs and/or buses (e.g., one or more commands for each CE and/or bus). The multi-access command can therefore be associated with any suitable number of stripes (e.g., stripes 802 and 804).

In other embodiments, to promptly service paging requests and file system metadata updates, the command dispatcher can determine a size of each command of the set of commands, and adjust the size of the set of commands based on the determined size. For example, if one or more commands include a large amount of data, the command dispatcher can select to decrease the number of commands used to form the multi-access command. Similarly, if the set of commands include mostly small commands, the command dispatcher can select to increase the number of commands used to form the multi-access command. This can allow the command dispatcher to optimize the transmission of the multi-access command, which can provide for further reductions in communication latencies.

For example, in one embodiment, the command dispatcher can calculate an average command size of the set of commands. The command dispatcher can then determine if the calculated average is above a pre-determined threshold. In response to determining that the calculated average is above the pre-determined threshold, the command dispatcher can exclude at least one command from the set of commands. Alternatively, in response to determining that the calculated average is below the pre-determined threshold, the command dispatcher can add at least one command to the set of commands. The commands that are excluded or added can be selected based on any suitable criteria such as, for example, the type of commands, I/O priorities, a fairly even distribution across different CEs and/or buses, and/or any combination thereof. In some embodiments, the command dispatcher can exclude or add commands in order to avoid I/O starvation.

Persons skilled in the art will appreciate that this is merely an illustrative example, and that the command dispatcher can use any suitable approach to adjust the size of the set of commands. Persons skilled in the art will further appreciate that any suitable combination of criteria can be used to select and/or adjust the set of commands used to form the multi-access command.

Figure 9:
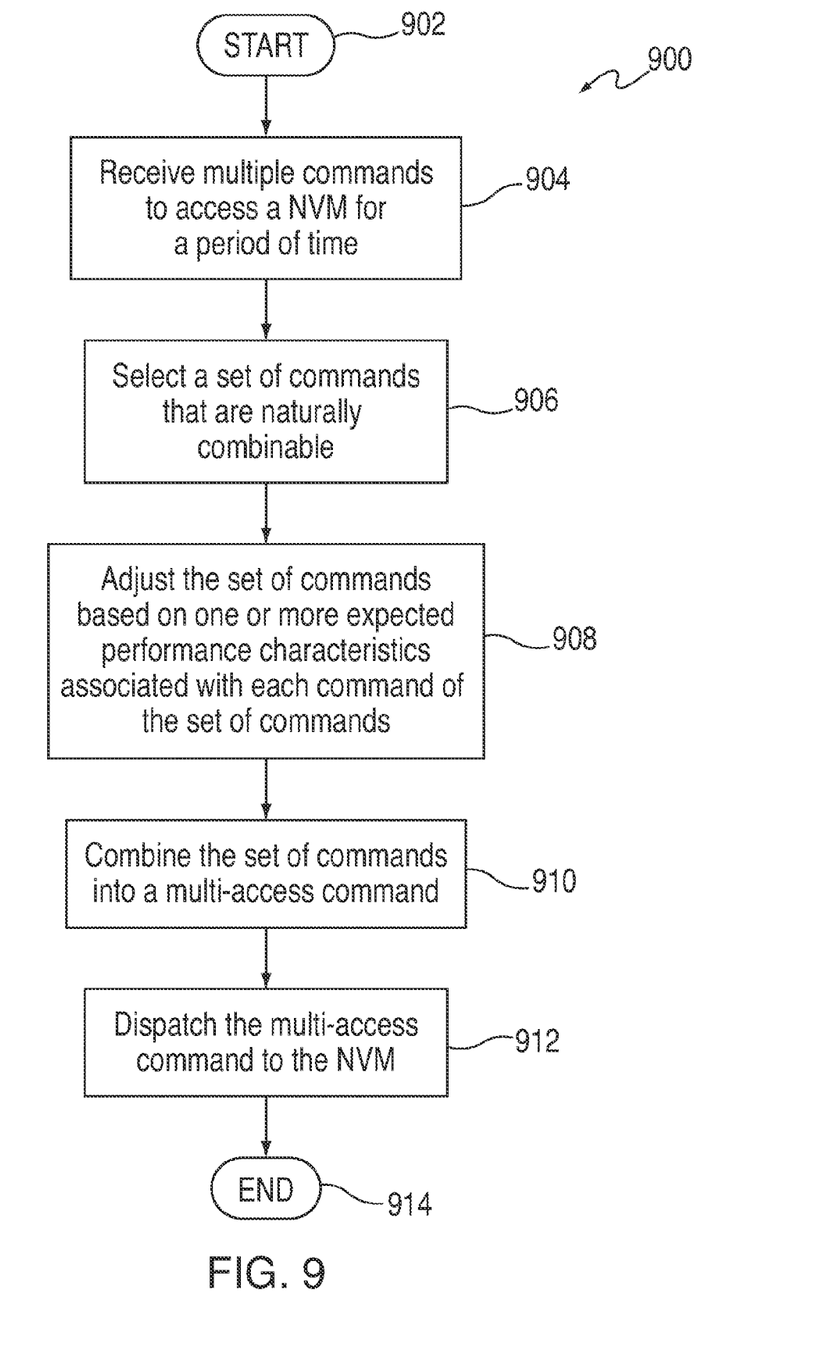
FIG. 9 is a flowchart of an illustrative process for selectively combining commands for a non-volatile memory in accordance with various embodiments of the invention.

Referring now to FIG. 9, a flowchart of illustrative process 900 is shown for selectively combining commands for a non-volatile memory. The steps of process 900 may be executed by a command dispatcher for any suitable electronic device or system, such as by command dispatcher 130 of electronic device 100 (FIG. 1), command dispatcher 230 of electronic device 200 (FIG. 2), or command dispatcher 330 of system 300 (FIG. 3).

Process 900 may begin at step 902, and at step 904, the command dispatcher can receive multiple commands to access a NVM (e.g., NVM 120 of FIG. 1, NVM 220 of FIG. 2, NVM 320 of FIG. 3, or NVM 820 of FIG. 8) for a period of time.

At step 906, the command dispatcher can select a set of commands (e.g., set of commands 602 of FIG. 6) that are naturally combinable (e.g., commands that share one or more common characteristics). For example, the command dispatcher may select commands that are the same type of command (e.g., read, program, or erase commands).

As another example, the command dispatcher can select the set of commands based on an I/O priority associated with each command. For example, the command dispatcher can first rank the multiple commands based on associated I/O priorities. The set of commands can then be selected based at least in part on a rank associated with each command (e.g., the set of commands can include commands that have the highest or lowest priorities).

Continuing to step 908, the command dispatcher can adjust the set of commands based on one or more expected performance characteristics associated with each command of the set of commands. In some embodiments, based on a mapping of commands to various portions of the NVM (e.g., CEs and/or buses), the command dispatcher can adjust the set of commands such that the commands can be fairly distributed across the different portions. For example, the command dispatcher can determine the physical addresses associated with the multiple commands. For instance, a translation layer (e.g., translation layer 214 of FIG. 2) of the system can be used to translate a set of logical addresses associated with the multiple commands into a set of physical addresses. Based on the set of physical addresses, the command dispatcher can determine a portion of the NVM (e.g., a CE and/or bus) that maps to each command. The command dispatcher can then combine or adjust the set of commands by adding and/or removing commands until the set of commands is fairly distributed across the different portions.

In other embodiments, the command dispatcher can determine a size of each command of the set of commands. Based on the determined size, the command dispatcher can adjust the size of the set of commands. For example, the command dispatcher can calculate an average command size of the set of commands. The command dispatcher can then determine if the calculated average is above a pre-determined threshold. In response to determining that the calculated average is above the pre-determined threshold, the command dispatcher can exclude at least one command from the set of commands. Alternatively, in response to determining that the calculated average is below the pre-determined threshold, the command dispatcher can add at least one command to the set of commands.

At step 910, the command dispatcher can combine the set of commands into a multi-access command (e.g., multi-access command 604 of FIG. 6). For example, the command dispatcher can combine a set of logical addresses, a set of counters, and a set of buffers associated with the set of commands.

Then, at step 912, the command dispatcher can dispatch the multi-access command to the NVM. In some embodiments, the command dispatcher can dispatch the multi-access command to one or more NVM dies (e.g., NVM dies 324 of FIG. 3) of the NVM. In other embodiments, the command dispatcher can dispatch the multi-access command to a NVM controller (e.g., NVM controller 322 of FIG. 3) of the NVM. The NVM controller can then separate the multi-access command into individual commands and perform associated access functions. Process 900 may then end at step 914.

It should be understood that process 900 of FIG. 9 is merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for reducing input/output ("I/O") overhead for a non-volatile memory ("NVM"), the NVM having dies, the method comprising:
   receiving a plurality of commands to access the NVM for a period of time;
   selecting a set of commands of the plurality of commands based on a mapping between each command of the set of commands to at least one portion of the NVM;
   combining the set of commands into a multi-access command; and
   dispatching the multi-access command to at least one of the dies of the NVM, wherein the combining comprises combining a set of logical addresses associated with the set of commands into an array of logical addresses.

2. The method of claim 1, wherein the selecting comprises selecting commands that are the same type of command.

3. The method of claim 2, wherein the set of commands comprises only read, program, or erase commands.

4. The method of claim 1, wherein the selecting comprises selecting commands for the set of commands that are small and sequential.

5. The method of claim 1, wherein the selecting comprises:
   ranking the plurality of commands based on associated I/O priorities; and
   selecting the set of commands based at least in part on a rank associated with each command of the set of commands.

6. The method of claim 1, wherein the combining further comprises combining a set of counters associated with the set of commands into an array of counters.

7. The method of claim 6, wherein the combining further comprises combining a set of buffers associated with the set of commands into an array of buffers.

8. A system comprising:
   a non-volatile memory ("NVM") comprising a plurality of portions;
   a translation layer operative to translate a set of logical addresses associated with the plurality of commands into a set of physical addresses;
   a bus controller operative to communicate with the NVM; and
   a command dispatcher for dispatching commands to the NVM, the command dispatcher operative to:
      receive a plurality of commands to access the NVM for a period of time;
      determine a portion of the plurality of portions that maps to each of the plurality of commands based on the set of physical addresses;
      combine a set of commands of the plurality of commands into a multi-access command, wherein the set of commands are distributed across different portions of the plurality of portions; and
      direct the bus controller to dispatch the multi-access command to the NVM.

9. The system of claim 8, wherein the portion of the NVM comprises at least one of a chip enable ("CE") or a bus.

10. The system of claim 9, wherein the NVM comprises a plurality of dies, and wherein each die is associated with a different CE.

11. The system of claim 10, wherein the command dispatcher is operative to dispatch at least a portion of the multi-access command to different dies of the plurality of dies.

12. The system of claim 8, wherein the command dispatcher is operative to:
   determine a size of each command of the set of commands; and
   adjust a size of the set of commands based on the determined size of each command.

13. A system comprising:
   a non-volatile memory ("NVM") comprising a plurality of portions;
   a bus controller operative to communicate with the NVM; and
   a command dispatcher for dispatching commands to the NVM, the command dispatcher operative to:
      receive a plurality of commands to access the NVM for a period of time;
      determine a portion of the plurality of portions that maps to each of the plurality of commands;
      combine a set of commands of the plurality of commands into a multi-access command, wherein the set of commands are distributed across different portions of the plurality of portions;
      direct the bus controller to dispatch the multi-access command to the NVM;
      determine a size of each command of the set of commands;
      adjust a size of the set of commands based on the determined size of each command;
      calculate an average command size of the set of commands;
      determine if the calculated average is above a pre-determined threshold; and
      in response to determining that the calculated average is above the pre-determined threshold, exclude at least one command from the set of commands.

14. The system of claim 13, wherein in response to determining that the calculated average is below the pre-determined threshold, the command dispatcher is operative to add at least one command to the set of commands.

15. A system comprising:
   a processor comprising a bus controller;
   a non-volatile memory ("NVM") operative to communicate with the processor, the NVM comprising a NVM controller; and
   a command dispatcher operative to:
      receive a plurality of commands;
      combine a set of commands of the plurality of commands into a multi-access command based at least in part on a common characteristic of the set of commands; and
      direct the bus controller to dispatch the multi-access command to the NVM controller,
   wherein the NVM comprises a plurality of memory locations, and wherein the NVM controller is operative to:
      separate the multi-access command into the set of commands;
      translate logical addresses associated with the set of commands into respective physical addresses; and
      perform access functions on memory locations of the plurality of memory locations corresponding to the respective physical addresses.

16. The system of claim 15, wherein the command dispatcher is implemented on the processor.

17. The system of claim 15, wherein the command dispatcher is operative to save the plurality of commands in a command queue.

18. The system of claim 17, wherein the command dispatcher is operative to:
- remove each command of the set of commands from the command queue; and
- save the multi-access command in the command queue.

19. The system of claim 18, wherein the command dispatcher is operative to save the multi-access command at the end of the command queue.

20. The system of claim 18, wherein the command dispatcher is operative to save the multi-access command at the beginning of the command queue.

21. The system of claim 15, wherein the command dispatcher comprises a block device driver, wherein the block device driver is operative to dispatch application programming interface ("API") operations to the NVM controller.

22. The system of claim 21, wherein the command dispatcher is operative to modify at least one parameter of the block device driver to transfer information associated with the set of commands.

23. A system comprising:
- a processor comprising a bus controller;
- a non-volatile memory ("NVM") operative to communicate with the processor, the NVM comprising a NVM controller; and
- a command dispatcher operative to:
  - receive a plurality of commands;
  - save the plurality of commands in a command queue;
  - combine a set of commands of the plurality of commands into a multi-access command based at least in part on a common characteristic of the set of commands;
  - remove each command of the set of commands from the command queue;
  - save the multi-access command at the beginning of the command queue; and
  - direct the bus controller to dispatch the multi-access command to the NVM controller.

24. A system comprising:

a processor comprising a bus controller;

a non-volatile memory ("NVM") operative to communicate with the processor, the NVM comprising a NVM controller; and a command dispatcher operative to:

receive a plurality of commands;

combine a set of commands of the plurality of commands into a multi-access command based at least in part on a common characteristic of the set of commands; and direct the bus controller to dispatch the multi-access command to the NVM controller, wherein the command dispatcher comprises a block device driver, wherein the block device driver is operative to dispatch application programming interface ("API") operations to the NVM controller, and wherein the command dispatcher is operative to modify at least one parameter of the block device driver to transfer information associated with the set of commands.

* * * * *